UNITED STATES PATENT OFFICE.

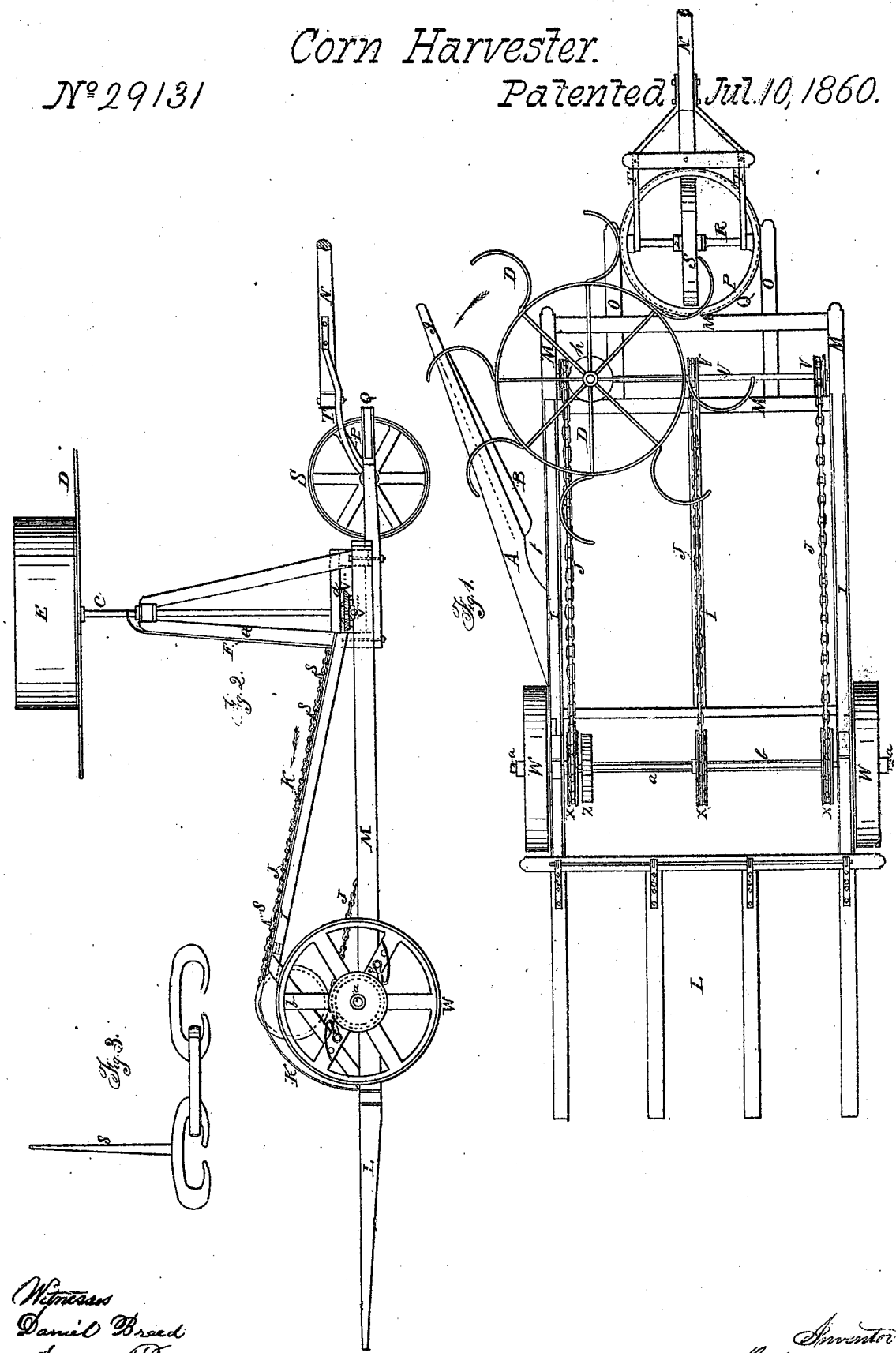

G. W. N. YOST, OF CINCINNATI, ASSIGNOR TO G. W. N. YOST & CO., OF YELLOW SPRINGS, OHIO.

IMPROVEMENT IN HARVESTERS OF CORN AND SUGAR-CANE.

Specification forming part of Letters Patent No. 29,131, dated July 10, 1860.

*To all whom it may concern:*

Be it known that I, G. W. N. YOST, of Cincinnati, in the county of Hamilton and State of Ohio, have invented a new and Improved Corn and Sugar-Cane Harvester; and I do hereby declare that the following is a full and exact description thereof, reference being had to the accompanying drawings, and to the letters of reference marked thereon.

In the accompanying drawings, Figure 1 represents a top view of my machine with the main platform removed to show the gearing. Fig. 2 is a side elevation, and Fig. 3 a view of the links in the endless chain.

My machine is supported by three wheels, W, W', and S, and any suitable frame, M M, drawn in the usual way by a tongue or spire, N. The front wheel, S, which will be more fully described hereinafter, is a caster-wheel, for convenience in turning the machine. The hind wheels are the driving-wheels for operating the endless chains I I and the reel-shaft C. The hind axle, $a$, turns with its wheels W W', and carries a cog-wheel, which gears into the cog-wheel $z$ on the shaft $b$. Therefore when the machine moves forward both the axle $a$ and the shaft $b$ are made to revolve. Consequently the cogged chain-wheels X X' X'' are also made to revolve, setting the chains I I in motion and causing the chain-wheels V V' V'' to revolve. The shaft W turns with its chain-wheels, and by means of the bevel-gear wheels V'''' and V''' transmits motion to the reel-shaft C, with which the drum E and arms D of the reel revolve. The main frame M and the frame I support the platform K, which extends obliquely backward and upward and then curves downward, as seen at K'. The bars L L form a rear platform, which may be folded up by means of hinges $c\,c$ to allow the machine to turn without knocking down the corn.

On one side of my harvester is a knife, B, set at a proper angle, with its edge inclined upward and its point downward. This knife is about three feet in length and three inches in width. It is made of sheet-steel and held by the knife-supporter A, which is of wood and extends beyond the point of the knife, as seen at $g$. The heel of the knife must be set a short distance from the frame, and the knife-supporter A should be somewhat cut away, so as to allow a free space behind the knife, as seen at $f$, for the purpose of preventing choking and of permitting uncut stalks, tangle, &c., to pass out freely. Now, as the machine is drawn forward in a proper direction for the stalks of corn or cane to come between the knife B and the frame M, the edge of the knife strikes the stalks with a sliding cut. At the same time the guard $g$, the revolving arms D, and drum E of the reel gather the stalks and press them against the knife to insure the complete cutting of all the stalks. The curved ends of the arms D, as they revolve, prevent the stalks from falling over the knife away from the machine, and they also carry the cut stalks along to insure their fall across the platform K. It is necessary to place the reel-shaft C near one side of the machine in such position that the drum E and arms D will press hardest against the stalks near the center of the knife, and release them just in time to let them fall across the machine. As the chains J J are in motion they constantly carry the stalks backward and deposit them upon the platform L L. The action of the chains is facilitated by the pins $s\,s$, cast with the strap or open links, as shown in Fig. 3. The stalks and leaves are prevented from entangling in the chain, the frame, or the hind wheels by the platform K. In like manner the guard F and drum E prevent the stalks and leaves from entangling in the frame G or in the reel. When a shock of corn has accumulated on the rear platform, L, it may be unloaded by simply thrusting a stake down between the bars L L, near the butts of the stalks and close to the hinge $c$, quite into the ground beneath. As the machine moves on the stake will clear the platform and swing the butts of the stalks out of the way of the machine at the next round.

On the axle $a$, near each hub-wheel, is fixed a ratchet-wheel, Y, into which a pawl catches. This pawl is fastened upon the hind wheel. The ratchet and pawl make the wheels and axle revolve together when the machine moves forward, and yet the wheels are prevented from giving a reverse motion to the axle in case the machine is moved backward.

The forward wheel, S, is cast upon its shaft R, which runs upon Babbitt's metal in bearings $p\,p$ of the circle P. The circumference of circle P is turned off, leaving two lips, between which is placed a wrought-iron band, Q. This band is bent into place, and then, without welding, secured by double pins to the wooden dogs O O.

Having thus fully described my invention, what I claim, and desire to secure by Letters Patent of the United States, is—

1. The combination of the knife B with its supporter A, when arranged in relation to each other and the side of the main frame as described, whereby the opening $f$ is provided at the heel of the knife, in the manner and for the purposes specified.

2. The combination and arrangement of the knife B, drum E, and arms D, guard F, endless chains J, and inclined platform I, the whole operating substantially as described, for the purpose of cutting cornstalks or cane and carrying the same to the rear of the machine when cut.

G. W. N. YOST.

Witnesses:
    DANIEL BREED,
    JOSEPHUS PARSONS.